Figure 1:
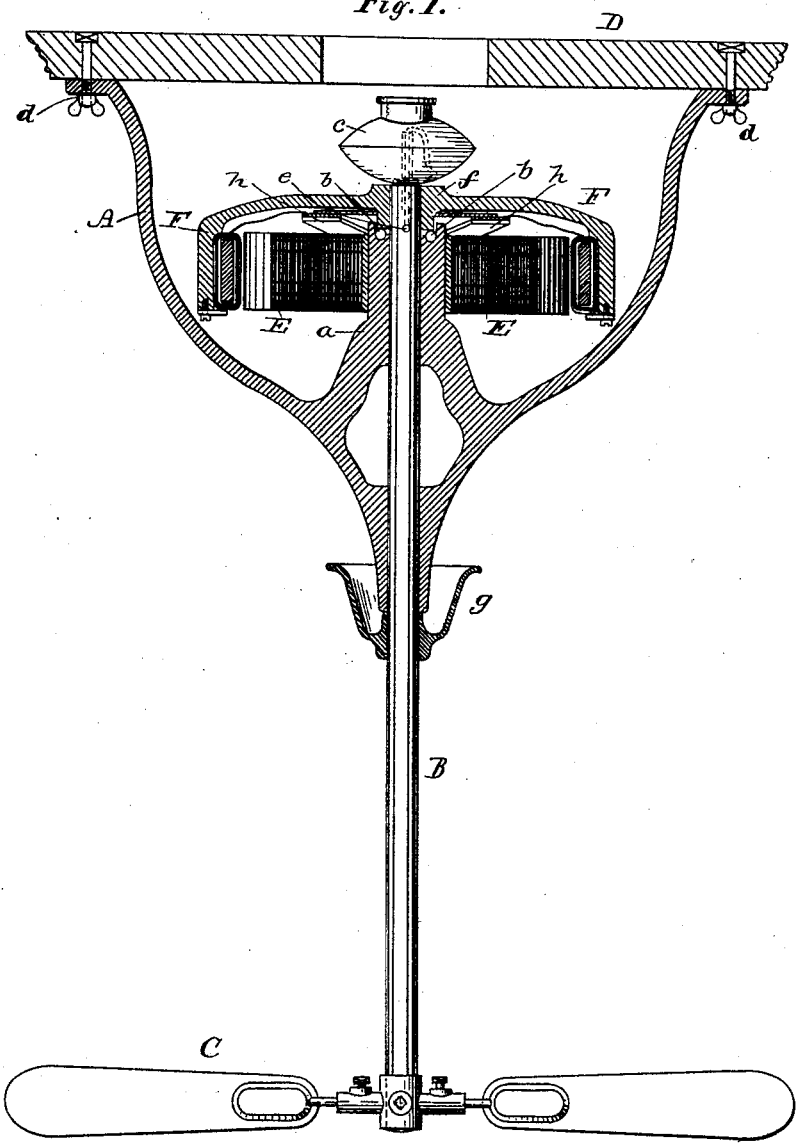

(No Model.) 2 Sheets—Sheet 1.

P. DIEHL.
ELECTRIC FAN MOTOR.

No. 414,757. Patented Nov. 12, 1889.

WITNESSES:
William Calver
Arlon V. Cushman

INVENTOR
Philip Diehl,
BY Henry Calver
ATTORNEY

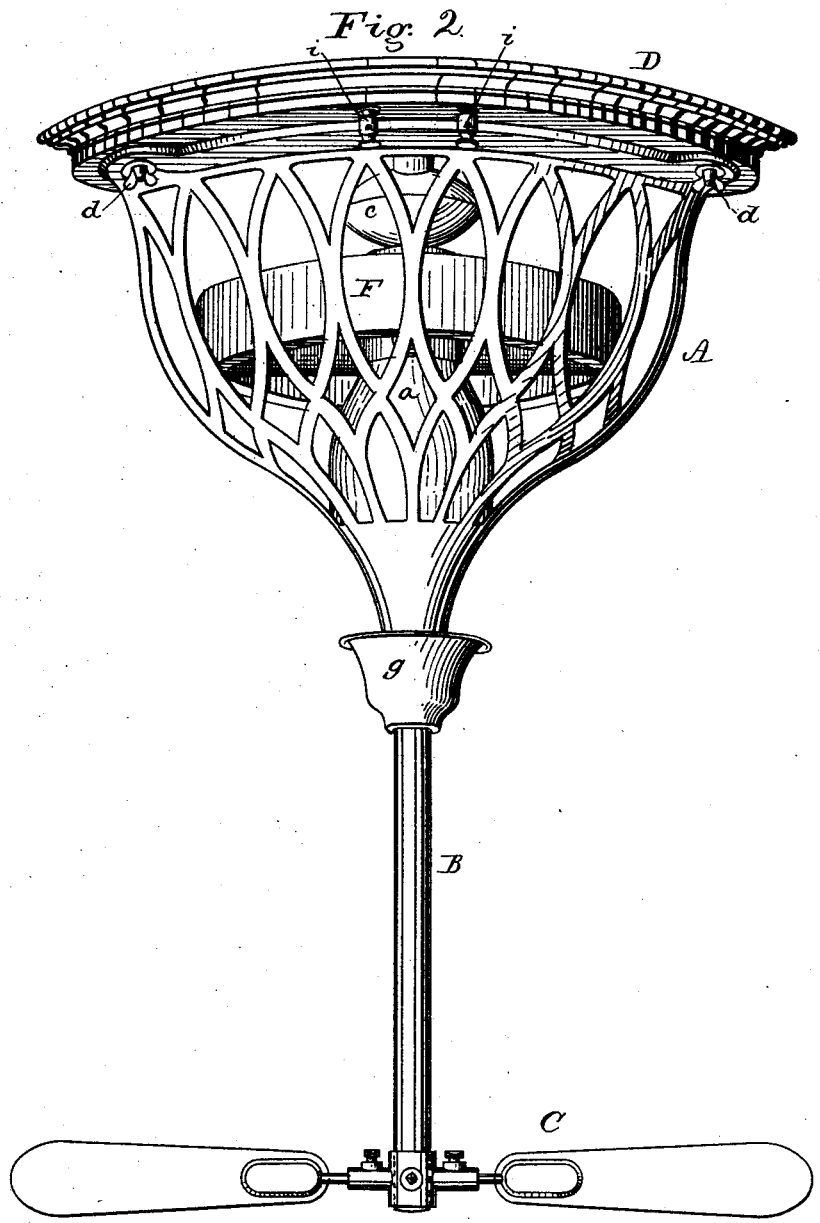

UNITED STATES PATENT OFFICE.

PHILIP DIEHL, OF ELIZABETH, NEW JERSEY.

ELECTRIC FAN-MOTOR.

SPECIFICATION forming part of Letters Patent No. 414,757, dated November 12, 1889.

Application filed June 20, 1889. Serial No. 314,923. (No model.)

*To all whom it may concern:*

Be it known that I, PHILIP DIEHL, a citizen of the United States, residing at Elizabeth, in the county of Union and State of New Jersey, have invented certain new and useful Improvements in Electric Fan-Motors, of which the following is a specification, reference being had therein to the accompanying drawings.

My invention has for its object to provide an electric fan-motor of such construction that the fan may be driven at a sufficiently rapid rate of speed with as little current as possible, and the construction also being such that while the fan-shaft will run very easily and always be properly lubricated oil will be prevented from dripping therefrom.

In the drawings, Figure 1 is a sectional elevation of my invention, and Fig. 2 is a perspective view thereof.

A denotes a basket or open-work bracket having a central hollow hub $a$ receiving the fan-shaft B, the latter being provided at its lower end with a fan C of any desired construction. The basket-bracket A is preferably attached to a circular wooden or non-metallic base D by thumb-screws $d$, so that it may be readily removed when desired, and the said base will be secured to the ceiling in any desired usual manner. To the hub $a$ is attached the stationary field-magnet E, and surrounding the field-magnet is the rotary armature F, the hub $f$ of which is secured to the fan-shaft B. The armature-wheel is preferably made in the form of a spider or open-work wheel for lightness and cheapness, with radial arms between the hub and rim. The hub $a$ is recessed at its top to form a cupped bearing for the hub $f$ of the armature-wheel, the said hub $f$ extending into the recess or cup of said bearing, and anti-friction balls $b$ are preferably arranged in said cupped bearing, so that the fan-shaft will run as lightly as possible. An oil-supply cup $c$, secured to the upper end of the shaft B or to the armature-wheel hub, and having a suitable capillary wick to conduct the oil down into a vertical hole in the end of the shaft and thence through a transverse opening $e$, keeps the bearings properly lubricated, while the cupped bearing holds the oil, and thus prevents it from working over onto the field-magnet.

To the shaft B, below the hub $a$, is secured an oil-cup collar $g$, which prevents the said shaft from moving upward, and which also catches any oil which may work down the shaft, and thus prevents any drip of the oil to the floor below.

The armature is made very large in diameter in proportion, so as to adapt the motor to a comparatively slow speed, suitable for a rotating fan, but giving great power to the motor from a comparatively slight current. The brushes $h$ of the motor are of ordinary construction and arrangement. Any suitable source of electricity may be employed to drive the motor and fan-shaft, the conductors being attached to the binding-posts $i$ on the rim of the bracket A.

By reference to Fig. 1 it will be seen that the construction of the parts is such that the entire weight of the fan-shaft and the armature attached to the upper end of said shaft is sustained by the hub $f$, resting in the horizontal cupped bearing at the upper end of the hub $a$ of the bracket A, while the vertical bearings of the said hub $a$, which receive and steady the vertical fan-shaft, are all below the part of said shaft to which the armature is attached. The cupped bearing in which the hub $f$ on the fan-shaft rests is of great advantage, as it obviates the necessity of frequent oiling, which is an important consideration in view of the fact that these fans are to be suspended from the ceilings, where they are rather inaccessible and are generally put up in places where the occupants are not familiar with machinery and do not like to give much attention thereto. In fact, by using an oil-supply cup, as $c$, or by making the cupped bearing somewhat larger than is herein shown, a supply of oil or other lubricant sufficient to last for several months or an entire season may be furnished to the motor when put up, and it will then run without further attention until it is taken down in autumn. As the basket-bracket A is open at its top, the field-magnet and armature are readily inserted in place before said bracket is attached to the support or base-piece D, and when placed in position for operation the parts of the motor are all properly housed or inclosed in said bracket. While I have herein shown the hub $f$ on the fan-shaft, and which, resting in the bearing of the supporting-bracket A, receives the weight of all the rotating parts, as being a part of the armature-wheel, I do not wish to be understood as limiting myself to this construction, as the said hub may be independent of the said wheel without departing from the feature of my invention of supporting the weight of the armature, fan-shaft, and fan by a hub on said shaft resting, preferably, in a cupped bearing adapted to hold the lubricant.

As my improved electric fan runs lightly and noiselessly, is easily put up and taken down without disfiguring the ceiling, (the ornamental base-piece D remaining permanently in place,) requires no belts, pulleys, or other machinery outside of itself, excepting the conductors, is neat and attractive in appearance, entirely out of the way, and can be started and stopped instantly by means of a switch, it is apparent that it is well adapted for the use intended.

I claim—

1. The combination, with the supporting-bracket, of the stationary field-magnet attached thereto, the rotary armature, and the vertical fan-carrying shaft, to the top of which the armature is secured, and which has all of its vertical bearings in said supporting-bracket below the point of attachment of said armature, said shaft having a hub resting against a horizontal bearing of the said supporting-bracket.

2. The combination, with the supporting-bracket provided with a cupped bearing, of a stationary field-magnet attached to said bracket, a rotary armature, and a vertical fan-carrying shaft, to the top of which said armature is secured, said shaft being provided with hub, as $f$, resting in said cupped bearing and having its entire vertical bearing in said supporting-bracket below the point of attachment of the said armature.

3. The combination, with the vertical fan-carrying shaft, of the open-topped bracket A, in which said shaft has bearings below its open top, the stationary field-magnet secured within said bracket, and the rotary armature attached to the top of the said shaft and having a hub $f$ resting against a horizontal bearing on the said bracket.

4. The combination, with the base-piece D, of the bracket A, detachably secured thereto and having a cupped bearing, the stationary field-magnet attached to said bracket, the vertical fan-carrying shaft, and the rotary armature attached to the top of said shaft and having a hub resting in said cupped bearing.

In testimony whereof I affix my signature in presence of two witnesses.

PHILIP DIEHL.

Witnesses:
HENRY CALVER,
ARLOW V. CUSHMAN.